UNITED STATES PATENT OFFICE.

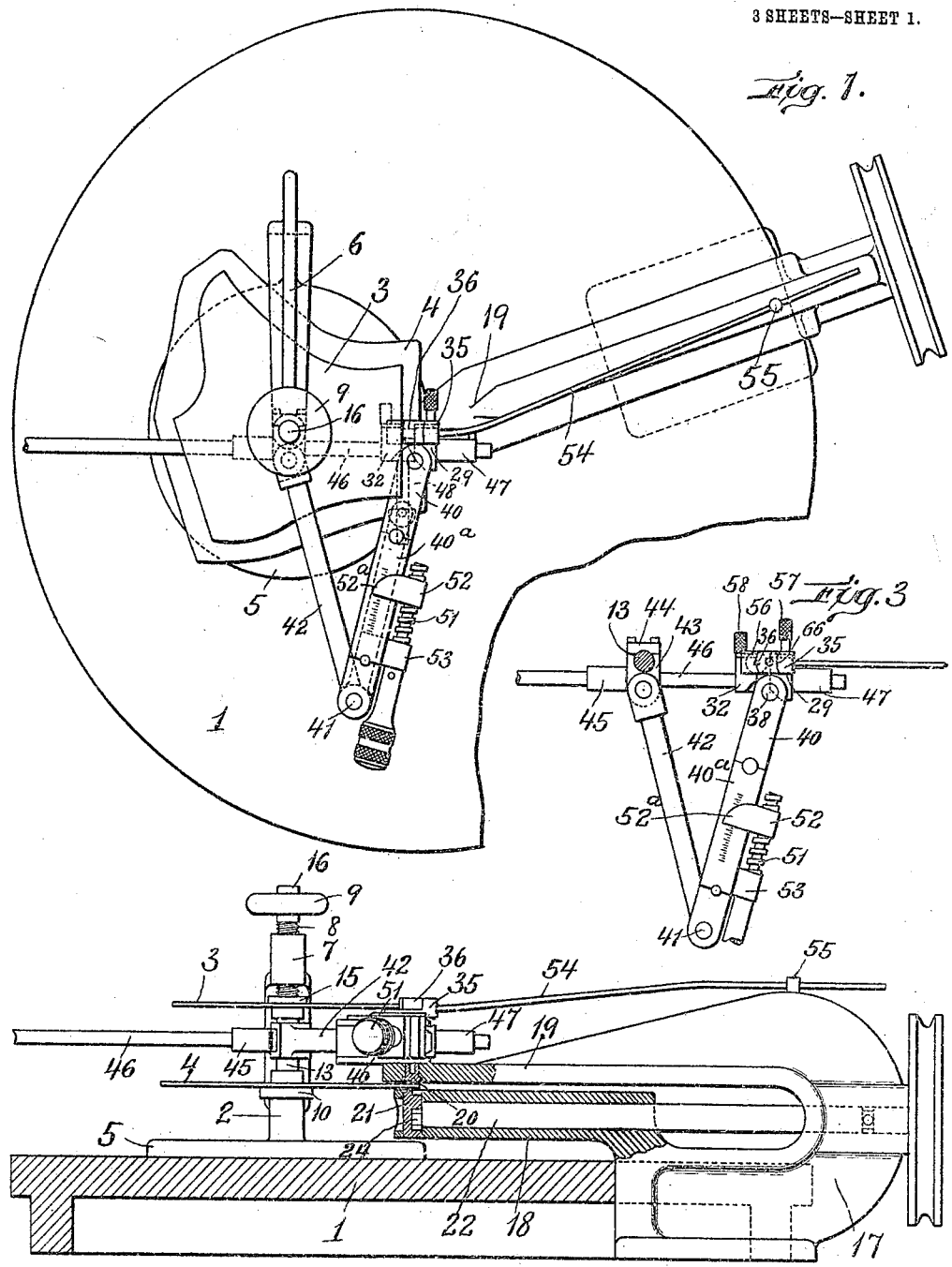

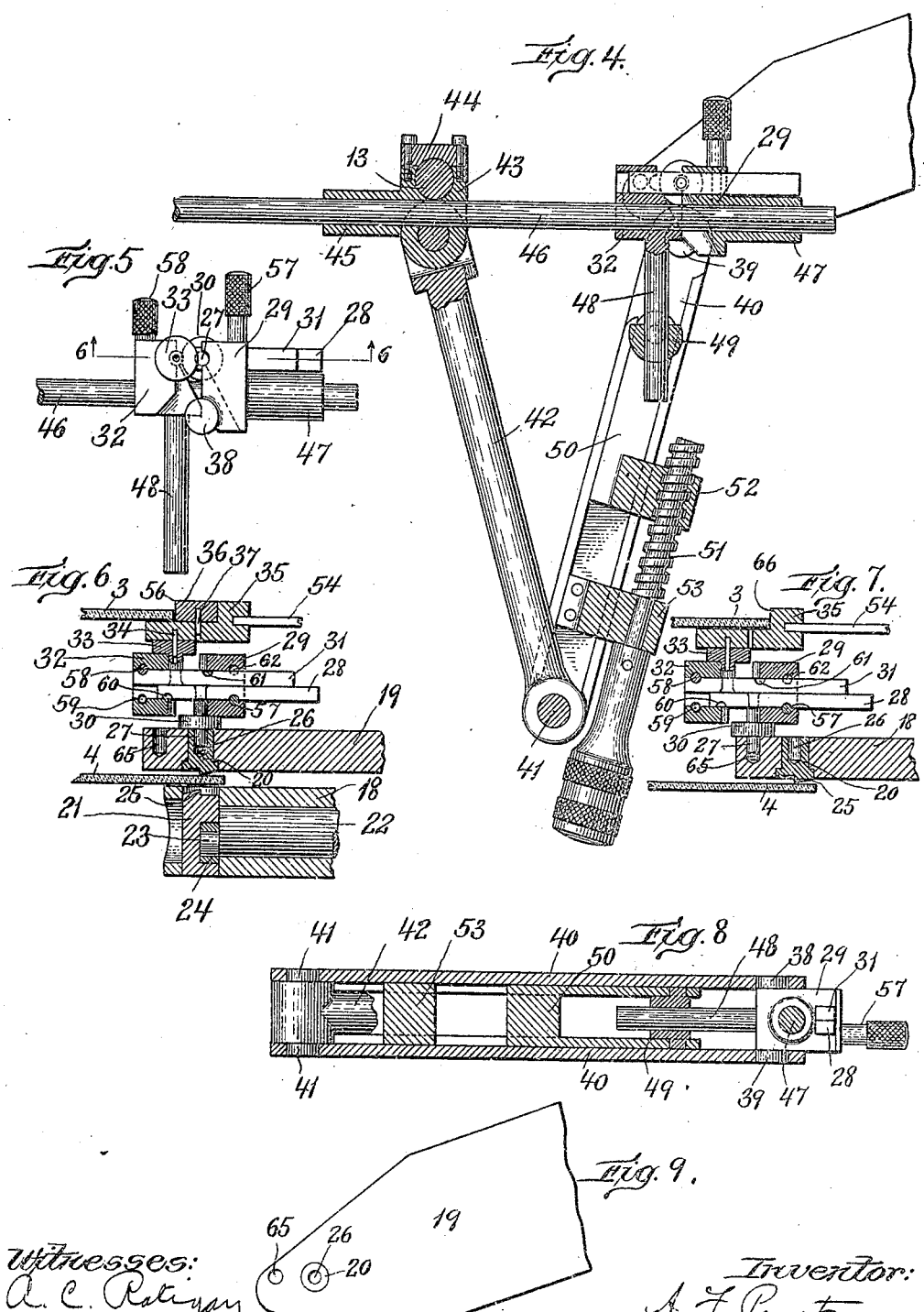

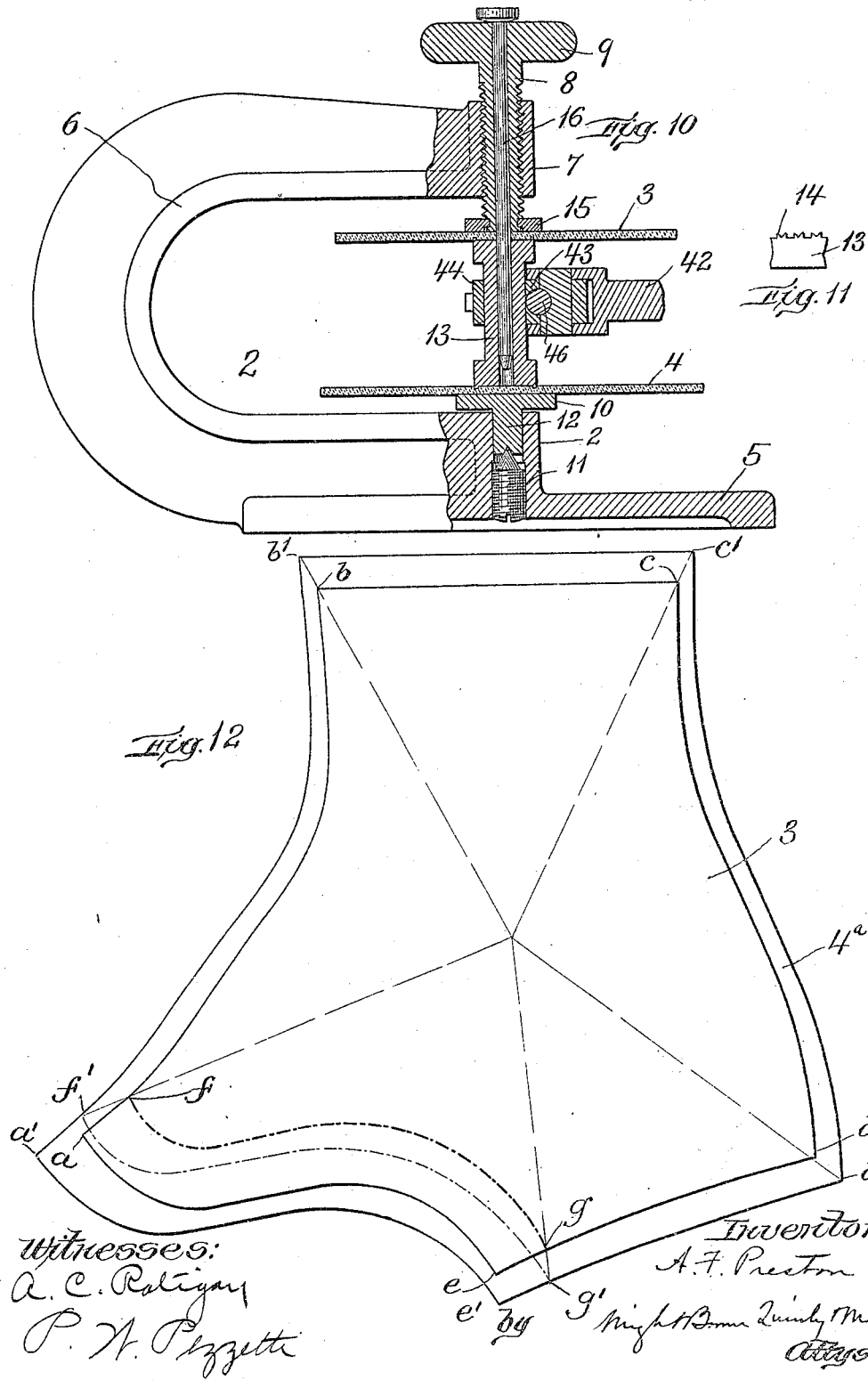

ALBERT F. PRESTON, OF EAST BOSTON, MASSACHUSETTS.

PATTERN GRADING AND CUTTING MACHINE.

951,886.  Specification of Letters Patent. Patented Mar. 15, 1910.

Application filed June 8, 1909. Serial No. 500,962.

*To all whom it may concern:*

Be it known that I, ALBERT F. PRESTON, of East Boston, in the county of Suffolk and State of Massachusetts, have invented certain new and useful Improvements in Pattern Grading and Cutting Machines, of which the following is a specification.

This invention relates to machines for making patterns, such for instance as are used in cutting out parts of boot and shoe uppers, and is of the same general nature as the machine illustrated in the patent granted to me September 1, 1908, No. 897,555.

The object is to enable enlarged or reduced patterns similar in outline to a standard pattern, but of a greater or less area than the latter, to be cut directly from a sheet of stock.

The machine illustrated in the patent above referred to was designed to mark the outlines of patterns in a stock sheet, such sheet to be subsequently cut along the lines marked by the machine in the formation of the complete pattern, but it is my present object to trace the outline of the pattern graded up or down from the standard pattern (that is, enlarged or reduced), and at the same time to sever or divide the pattern thus traced from the remainder of the sheet.

Another object of the present invention is to provide means by which all patterns outlined or cut in accordance with a standard or guide pattern may have a uniform allowance at the seam edge or edges for the overlap which occurs at the seam between two pieces of the upper, or, in other words, that each pattern, whether larger or smaller than the standard, may be provided with a strip or zone at its seam edge or edges of the same width as the corresponding parts of all other sized patterns, the inner boundary of which strip is correctly graded with respect to the corresponding imaginary boundary line an equal distance back from the similar edge of the standard pattern. That is, my aim is to supply my grading machine with provisions enabling the enlargement or reduction of the standard pattern to be effected, not only from the edges thereof, but also from points within the periphery of the pattern at a uniform predetermined distance from any desired one of its edges, so that adjacent pieces of an upper cut according to the patterns so designed may be assembled together correctly to make a properly fitting upper, neither too full nor scant. In carrying this object into effect I arrange the machine so that any desired side of the standard pattern may be advanced and caused to overlie or project beyond the point where its edges normally engage the guiding part of the proportional motion grading mechanism of the machine, so that, when relative motion between the pattern and such guiding part takes place, points some distance back of the edge thus projecting are carried past the guiding point, and the effect is the same as though this edge or side of the pattern were cut away back to such line of points. At the same time the connection between the proportional motion mechanism and the tool which outlines the secondary pattern in the stock is shifted outward by a substantially equal amount so as to add a strip equal in width to this amount to the corresponding side or edge of the pattern, the resultant effect being to outline such edge of the secondary pattern a fixed distance beyond an imaginary line which is, respectively, enlarged or reduced from an imaginary line of the standard pattern located at an equal distance within the corresponding edge of the latter.

These objects are carried into effect by principles which are hereinafter described and are embodied in mechanism illustrated in the accompanying drawings, in which—

Figure 1 represents a plan of a machine having mechanisms to carry out in the best way at present known to me the objects above set forth. Fig. 2 is a sectional view of the same. Fig. 3 is a plan view of the pantographic mechanism by which proportional enlargements or diminutions of a standard pattern are effected. Fig. 4 is a sectional plan view on an enlarged scale, of the same mechanism. Fig. 5 is a plan view of a detail of said mechanism. Fig. 6 is a vertical section of the parts shown in Fig. 5, taken on line 6—6 of Fig. 5, and illustrating the adjustment of the mechanism for grading in accordance with the edge of the standard pattern. Fig. 7 is a sectional view similar to Fig. 6, showing the adjustment for grading from an imaginary line within the periphery of the standard pattern. Fig. 8 is a sectional view of one arm of the pantographic mechanism. Fig. 9 is a plan view showing a detail of the machine. Fig. 10 is a sectional elevation of the pattern and stock holder. Fig. 11 is a detail of the clamps used for securing the pattern and stock in the holder. Fig. 12 is a plan view of a standard pattern and an enlarged pattern graded therefrom, illustrating the manner of grading the seam edge of the pattern.

The same reference characters indicate the same parts in all the figures.

The machine consists of a table or base 1 on which is mounted a work holder 2. The latter is preferably arranged so that it may slide upon the supporting surface of the table 1 and serves to hold both the pattern 3 and a sheet of stock 4 from which a graded pattern is to be cut. Preferably the pattern is superposed above the stock sheet, although this relative arrangement may be reversed if desired. The work holder consists of a wide supporting base 5 from which rises a goose neck 6 terminating in a head 7 directly above the base, which head is tapped to engage the threads on the shank of a clamp 8 having a hand-wheel or disk 9 by which it may be turned. In the base of the holder is set a table 10 which is freely rotatable, being preferably supported as illustrated in Fig. 10, upon the tip of a pointed screw 11 set in from the under side of the holder base. The table 10 has a shank 12 entering a socket in the holder frame and resting against the point of the screw 11, being thereby retained in place. The stock sheet 4 rests directly on the table 10 and is engaged by an intermediate clamp 13 of which the upper end engages the under surface of the pattern 3. Each end of the clamp 13 has a circular series of teeth or prongs 14, as shown in Fig. 11, which indent and firmly clamp the stock sheet and pattern when the clamp 8 is screwed down on the latter. A disk 15 is mounted on the end of the clamp 8 to give a wider bearing on the pattern and apply the pressure of the clamp directly over the indenting prongs. The intermediate clamp 13 is retained in place by a pin 16 passing through the center of the clamps 8 and 13, which are bored to receive it.

At one side of the base or table 1 of the machine is set a frame 17 having two arms 18 and 19 which extend over the table 1. The latter of these arms holds a stationary cutter 20, while the other arm has a guideway in which the movable cutter 21 is enabled to travel toward and from the stationary cutter. The arm 18 also forms a bearing for the shaft 22, which has a driving connection with the movable cutter, such connection being preferably an eccentric pin 23 projecting from the end of the shaft, and a roll 24 on said pin entering a groove in the cutter. The arm 18 is raised above the table 1 sufficiently to admit the base 5 of the work holder to pass under it, while the space between the arms 18 and 19 is located at the height of the stock sheet 4, and is wide enough to permit the latter to enter between the cutters. These cutters, as shown in Fig. 6, are blocks, each of which has a shoulder 25, and the relative arrangement of which is such that the shoulders are opposite to one another, so as to act as shears to enter the stock from opposite sides and divide the same.

In the arm 19 directly above the shearing edges of the cutters and preferably in a socket 26 in the stationary cutter, is set a pin 27 carried by a bar 28 which is contained in and adjustably fastened to a block 29. This pin has a collar or flange 30 which rests upon the upper surface of the arm 19. Lying beside or on the bar 28 is a second bar 31 which passes movably through the block 29 and is detachably fastened to a block 32. This second bar carries a stud 33 having an enlargement which overlies and rests upon the block 32, and has a central socket to receive a dowel pin 34 by which a guide block 35 is detachably positioned thereon. On the guide block 35 is a secondary detachable block 36 held by a dowel 37, the edge of which normally serves as a guide for the pattern 3, and with which the edges of the latter are normally held in engagement while the machine is in operation. The block 29 has studs 38 and 39 shown in Figs. 4 and 5, which serve as trunnions for the side bars of a link 40. The outer or swinging end of this link receives studs 41 on the outer end of a second link 42, the opposite end of which link is pivoted to a block 43, which latter is pivotally mounted upon the work holder, being formed so as to embrace the intermediate clamp 13. It has a recess in which said clamp is contained, and carries a detachable cap 44 which embraces the part 13. On the block 43 is a hub or sleeve 45 in which a rod 46 is contained and through which the latter is adapted to slide, and this rod passes also through the blocks 32 and 29 and into a sleeve 47 projecting from the latter, in which it is held. Projecting from one side of the block 32 is a pin or arm 48 which lies between the bars of the link 40, as shown in Fig. 8, and is slidingly contained in a swivel block 49 pivoted in a slide 50 contained in said link. This slide is adjustable in guideways formed in the interior faces of the link bars 40 and is adjusted by means of a screw 51 passing through a tapped lug 52 of the slide and contained rotatably in a block 53, which is secured to the link bars 40. The purpose of this adjustment will be described later on. A guide 54, preferably in the form of a rod or bar, is secured at one end in the gage block 35 and is connected at 55 with the arm 19. Its object is to prevent the gage block 35 from turning to any great extent about the pin 27 as an axis, and to keep it approximately at right angles with the cutting edges of the cutters.

The parts last described constitute a pantographic mechanism by which the form of the pattern 3 may be reproduced in enlarged or diminished area on the stock sheet 4. The pivot 27 which coincides with the line of action of the cutters is the stationary pivot about which the other parts of the mechanism, including the pattern and stock clamp, are rotatable and from and toward which they are linearly movable. For the purpose of convenience of construction, the cutters, which correspond with the marking point of the usual pantograph, are fixed in one position, and the pattern and stock clamp, which ordinarily would serve as the stationary pivot, is made movable. It is obvious, however, that there is no inherent impossibility of reversing or modifying this arrangement, and therefore I do not limit the present invention to the precise arrangement shown. The guide or gage 35 is also movable both with respect to the pattern holder and cutters, so that when the holder is moved toward or away from the stationary center 27, the guide or gage is correspondingly moved by a fractional amount.

In use the edges of the pattern are successively brought against the face 56 of the guide block 36 and are moved along in contact therewith, and the edge of the stock sheet is inserted between the cutters. The pattern holder is brought toward and from the stationary center according as the outlines of the pattern are near or remote from the clamp, and with each of these movements the gage or guiding surface 56 is brought nearer to or farther from the line in which the cutters act. Thereby the work cut from or outlines in the stock sheet has an outline which is exactly similar to that of the pattern, but proportionally larger or smaller than the same.

This mechanism may be employed either for grading up, that is, forming patterns larger than the standard or guide pattern, or grading down, that is, making smaller patterns. In the adjustment shown in the drawings, the machine is adapted for grading up, but it may readily be adapted for grading down, by changing the relative connections between the bars 28 and 31 and the blocks 29 and 32. As appears in Figs. 5, 6 and 7, the bars are detachably connected with their respective blocks by pins 57 and 58, which are inserted laterally into the blocks through holes which are so located that the sides of the pins project into the channels in which the bars are contained and may enter notches adjacent thereto in the several bars. Each block has two perforations, and each bar has two notches. Either pin may be removed from the hole in which it is shown in Figs. 6 and 7, in which case the blocks and bars may be relatively moved. If the pin 57 is removed and the block 32 shifted so that the perforation 59 therein registers with the notch 60 in the bar 28, the latter block will then be rigidly connected with the center 27. Upon removing the pin 58 from the block 32, shifting the bar 31 so that its notch 61 registers with the aperture 62 in the block 29, and then inserting the pin through the latter notch and aperture, the bar 31 and gage may be rigidly secured to the block 29. This adjustment enables the pattern 3 to extend beyond the line of action of the cutters and permits proportionately smaller patterns to be cut from the stock sheet. In either case the action of the pantograph is the same, the gage being shifted relatively to the cutters as the work holder is moved in and out, and the only difference being that when grading up, the gage is between the cutters and holder, while in grading down, the cutters are between the holder and gage. The adjustment of the block or slide 50 by means of the screw 51 is to shift the blocks 29 and 32 relatively to one another so as to increase or diminish the movement of the gage relatively to the cutters, whereby greater or less proportional movements of the gage are produced when the pattern and stock holder is moved. Thus, for producing patterns of nearly the same size as the standard pattern, the adjustment is made so that the blocks 29 and 32 are near together, while for producing much greater or smaller patterns, the blocks are more widely separated. Patterns of exactly the same size and shape of the standard may be made by securing both bars 28 and 31 to the block 29. There is then no relative motion between the gage and pivot 27 and the guiding element 56 of the gage is in direct alinement with the pivot.

As has already been stated, the cutters have a shearing action by means of the acute-angled shoulders 25 thereon. I have found that for cutting thick stock, such as is indicated in the drawings, it is advisable that the shoulders 25 of the opposed cutters, should not travel past one another, and that they need not be of so great extent or height as the thickness of the stock. Thus constructed the cutters do not pass directly through the stock, but indent it upon opposite sides, thereby cutting the superficial fibers and offsetting and breaking the intermediate ones. This effectively divides the stock and produces edges on the pattern cut therefrom which are sufficiently smooth for the purposes required.

One of the objects of my invention is to produce patterns graded up or down from a standard pattern, which are of such proportions that pieces of upper leather cut therefrom may be joined with the adjacent pieces necessary to form a complete shoe upper correctly and without making the upper too full or too scant. Where two pieces of a shoe upper are joined together their edges overlap a considerable distance in forming the seams and the amount of overlap is the same in all the sizes. It is essential therefore that the area allowed on a pattern for the seam overlap should not be greater or less on a larger or smaller pattern than that provided for in the standard pattern, since otherwise when the pieces of leather cut according to the patterns are put together, the upper will be too full in the one case and scant in the other. When patterns are graded according to the methods heretofore in use, this objectionable result occurs, because the graded patterns are enlarged or reduced from the seam edge of the standard pattern as well as from the other edges thereof, and consequently the amount allowed in the standard pattern for the seam is enlarged or reduced in the secondary pattern in proportion with the rest of the pattern. In order to have the graded patterns correct, it is essential that they be graded, not from the seam edge of the standard pattern, but from a distance back of such edge approximately equal to the amount of overlap of the adjacent part of the upper, or in other words, from an imaginary line coinciding with the overlapping edge of the adjacent piece of the upper. By my present invention I have made my machine capable of grading patterns from such an imaginary line back of the seam edge of the standard pattern, thereby allowing for an equal seam overlap in patterns of all sizes, while locating the seam edges of the graded patterns in the proper position in all cases.

The object aimed at will be understood from an inspection of Fig. 12, in which a standard pattern is represented at 3 and an enlarged pattern at $4^a$. The standard pattern consists of the edges $a$—$b$, $b$—$c$, $c$—$d$, $d$—$e$ and $a$—$e$, of which the last is the seam edge. The corresponding piece of upper leather cut according to this pattern is adapted to overlie and be stitched to another piece of the upper at this edge. The broken line $f$—$g$ on the pattern 3 represents the inner boundary of the seam strip and constitutes the imaginary line from which this edge of the secondary pattern is to be graded, the area between the lines $a$—$e$ and $f$—$g$ forming the seam strip which is to be left of uniform width in patterns of all grades. I secure the result of grading the secondary pattern from the imaginary line $f$—$g$ by constructing the machine so that although the edge $a$—$e$ of the patterns serves as the actual guide, the effect is as though the strip $a$—$e$ $f$—$g$ were entirely cut off and the edge $f$—$g$ were the guide. If I did nothing more than this, the resulting pattern would have the outline represented by $f'$ $b'$ $c'$ $d'$ and $g'$ on the pattern 4. I provide for making the secondary pattern complete as shown by the full lines $a'$ $b'$ $c'$ $d'$ and $e'$, by constructing the machine so that the strip $a'$ $e'$ $f'$ $g'$ is added to the secondary pattern at the same time that the strip $a$ $e$ $f$ $g$ is in effect subtracted from the primary or guide pattern. This result is effected by means of the removable guide block 36 and a second aperture or socket 65 in the arm 19, which is separated from the socket 26 in the stationary cutter by an amount equal to the width of the block 36. As illustrated in Fig. 6, the guiding edge 56 of the block 36 is directly over the dowel pin 34 which connects the gage 35 to the bar 31, and when this bar is connected, as shown, with the block 32, the dowel and edge 56 are directly above the center of the bar 48, which connects this block with the pantograph linkage. Thus the normal guiding element 56 of the gage 35 is in alinement with the point of connection of the gage to the pantograph mechanism. In operation, while the pattern is moved past the guiding edge 56, it is turned back and forth as curved portions thereof pass the gage, so that the tangent point between its edge and the guide is always directly in alinement with this point of connection. In this way the stock sheet is guided so that the outlines traced thereon are exactly proportional in extent and location to those of the pattern. As already stated, the block 36 is removable, and when removed, the guiding edge or element 56 is inoperative. This leaves a second or auxiliary guiding element 66 on the body of the gage block 35 against which the edge of the pattern may be held, as shown in Fig. 7. When thus placed the pattern overlaps the normal guiding point by an amount which is made equal to the seam overlap, and is ordinarily about half an inch. When the edge $a$ $e$ is carried past and in contact with the guide element 66, points lying in the imaginary line $f$ $g$ are brought over the normal guiding point, and if the position of the mechanism relatively to the cutters were not changed, the effect would be to advance the stock farther between the cutters and sever the stock along the line $f'$ $g'$. The pattern thus produced would bear the same relation along the line $f'$ $g'$ to the imaginary line $f$ $g$ of the guide pattern as the other edges of the secondary pattern bear to the corresponding sides of the standard. Before the seam edge of the graded pattern is cut, however, the pivot pin 27 is shifted from the socket 26 to the socket 65, and as the distance between these sockets is the same as that between the guiding elements 56 and 66, the net result is the cutting of the second pattern along the edge $a'\ e'$. This edge, however, does not have the same proportion to the edge $a\ e$ as exists between the other edges of the two patterns, but represents an increment of constant width added to an imaginary line $f'\ g'$ graded from the imaginary line $f\ g$ of the standard pattern. If the edge $a'\ e'$ were graded directly from the edge $a\ e$ of the pattern 3, it would lie at too great a distance from the center, and the pattern 4 would thus be too full at this edge, while conversely, a secondary pattern graded down from the standard would be too small or too scant at the seam edge. By grading from a uniform distance back of the edge of the standard pattern, however, and adding on a fixed amount, a pattern is produced which is of exactly the right size, so that pieces of leather cut in accordance therewith may be assembled correctly with other parts of the upper.

The principle last described, according to which patterns may be graded up or down from a point a constant distance within one or more of the edges of a standard pattern, is not limited in its application to a mechanism specifically as illustrated and described, or one having a pantographic or proportional-motion mechanism exactly such as set forth, but is applicable to other specific reproducing mechanisms. Consequently I do not limit the application of this feature of my invention to machines of the particular type herein illustrated, but claim the exclusive right to the practice of the same in connection with any form of pattern-reproducing and grading mechanism whatever. I desire it to be further understood that I do not limit the application of the principles of my invention to a machine in which the tool for defining the outlines of the secondary pattern is a cutter or a pair of coöperating cutters adapted to sever the secondary pattern from the stock, but declare that the same may be made use of in machines in which the corresponding tool is a marker or scorer.

I claim:—

1. A pattern-grading machine comprising a pattern, means guided by said pattern for causing an outline similar to that of the pattern to be traced, and means whereby the outline, or a part thereof, thus traced may be graded from an imaginary line within the periphery of the pattern.

2. A pattern-grading and cutting machine comprising a cutter, a stock and pattern holder movable to carry the stock past said cutter, a guide with which the edge of said pattern is maintained in contact, and mechanism for shifting said guide when the said holder is moved toward or from said cutter.

3. A pattern-grading machine comprising a holder having means for gripping a pattern and stock, a cutter, a guide, and pantographic mechanism connecting said holder, cutter and guide whereby relative movement between two of said elements will produce a proportional relative movement of the third.

4. A pattern-grading machine comprising a holder having means for gripping a pattern and stock, a cutter constructed to divide the stock, a guide against which the edges of the pattern are held in operation, pantographic mechanism connecting said holder, cutter and guide whereby relative movement between two of said elements will produce a proportional relative movement of the third, and provisions permitting shifting of the positions of said cutter and guide relatively to one another independently of that caused by said pantographic mechanism.

5. A pattern-grading machine comprising a pattern and stock holder, a cutter constructed and arranged to cut the stock, a guide adapted to coöperate with the edge of the pattern, a pantograph having connection with said holder, guide and cutter, adapted to vary the distances between the cutter and holder proportionally to variations in distances between the holder and guide, and provisions whereby the point of connection between said pantograph and cutter may be altered.

6. A pattern-grading machine having means for outlining a pattern similar in general to a standard pattern which serves as a guide, and means for causing the pattern outlined to be graded either from the edges of the guiding pattern or from imaginary lines located at a uniform distance within the edges of the guiding pattern.

7. A pattern-grading machine comprising a tool adapted to form the outlines of a pattern on a sheet of stock, a holder for a standard or guide pattern, and mechanism connected with said outlining tool and holder for causing said tool to define a larger or smaller pattern than said standard or guide pattern, and including means by which the enlargement or reduction may be made either from the edges of the guide pattern or from a definite distance within one or more of such edges.

8. A pattern-grading machine comprising a holder for a standard or guide pattern, an outlining tool for forming lines on a sheet of stock, mechanism for causing such lines to be proportional and similar to the edges of said pattern, but of different extent, whereby to form enlarged or reduced patterns, and means by which the pattern produced may be enlarged by a fixed amount at any of its edges over the proportional size.

9. A pattern-grading machine comprising a holder for a standard or guide pattern, an outlining tool for forming lines on a sheet of stock, mechanism for causing such lines to be proportional and similar to the edges of said pattern, but of different extent, whereby to form enlarged or reduced patterns, and means by which the pattern produced may be reduced at any of its edges by a fixed amount.

10. A pattern-grading machine comprising a holder for a standard or guide pattern, a guide with which said pattern coöperates, means for holding a sheet of stock from which a pattern is to be cut, a tool for outlining the pattern on such stock, and proportional-motion mechanism connected with said holder, guide and outlining tool for varying the distances between the holder and tool proportionately to the distances between the holder and guide for producing enlargements or reductions of the standard pattern, said guide having provisions for permitting overlapping of the pattern edges beyond the normal guiding point, whereby the enlargement or reduction may be made from points within the periphery of the pattern.

11. A pattern-grading machine comprising a holder for a standard or guide pattern, a guide with which said pattern coöperates, means for holding a sheet of stock from which a pattern is to be cut, a tool for outlining the pattern on such stock, proportional-motion mechanism connected with said holder, guide and outlining tool for varying the distances between the holder and tool proportionately to the distances between the holder and guide for producing enlargements or reductions of the standard pattern, and means by which the enlargement or reduction at a seam edge of the pattern may be taken from points within the periphery of the standard pattern.

12. A pattern-grading machine comprising a holder for a standard or guide pattern, a guide with which said pattern coöperates, means for holding a sheet of stock from which a pattern is to be cut, a tool for outlining the pattern on such stock, proportional-motion mechanism connected with said holder, guide and outlining tool for varying the distances between the holder and tool proportionately to the distances between the holder and guide for producing enlargements or reductions of the standard pattern, and means for grading a seam edge of the pattern from a distance back from the corresponding edge of the standard pattern approximately equal to the amount of overlap of the seam.

13. A pattern-grading machine comprising a holder for a standard or guide pattern, a guide with which said pattern coöperates, means for holding a sheet of stock from which a pattern is to be cut, a tool for outlining the pattern on such stock, proportional-motion mechanism connected with said holder, guide and outlining tool for varying the distances between the holder and tool proportionately to the distances between the holder and guide for producing enlargements or reductions of the standard pattern, means for grading a seam edge of the pattern from a distance back of the corresponding edge of the guide pattern approximately equal to the overlap of the seam, and means for adding the same amount to the pattern outlined in the stock.

14. A pattern-grading machine comprising a pattern holder adapted to carry a standard pattern, means for holding a sheet of stock from which a pattern similar to such standard is to be formed, a tool for outlining such second pattern in the stock, a guide or gage with which the edge of said standard pattern is engaged, proportional-motion mechanism for effecting a relative motion between the stock and tool proportional to that between the standard pattern and gage, means forming part of said gage by which the standard pattern may be caused to project beyond the normal guiding point, and means for advancing the relative location of the outlining tool by an amount equal to the projection of the pattern.

15. A pattern-grading machine comprising a pattern holder adapted to carry a standard pattern, means for holding a sheet of stock from which a pattern similar to such standard is to be formed, a tool for outlining such second pattern in the stock, a guide or gage with which the edge of said standard pattern is engaged, proportional-motion mechanism connected with said holder, gage and outlining tool for varying the relations between the stock and tool proportionately to the relations between the standard pattern and gage, said gage having a plurality of guiding elements at different distances from said holder, engageable interchangeably with the standard pattern, and provisions for changing the connection of the tool and proportional mechanism by an amount equal to the distance between said elements.

16. A pattern-tracing machine comprising a holder for a standard or guiding pattern, means for holding a sheet of stock from which a secondary pattern is to be formed, a tool holder, a tool for outlining in such stock the form of a pattern, a gage, and pantographic mechanism connected with said pattern holder and gage, and means whereby said pantographic mechanism may be connected with said tool holder in a plurality of positions relatively to said outlining tool.

17. A pattern-tracing machine comprising a holder for a standard or guiding pattern, means for holding a sheet of stock from which a secondary pattern is to be formed, a tool holder, a tool for outlining in such stock the form of a pattern, a gage, pantographic mechanism connected with said pattern holder and gage, said gage having guiding means to coöperate with the edges of the standard pattern and being arranged so that the pattern may be advanced relatively to the gage beyond the normal position of said guiding means, and provisions whereby said pantographic mechanism may be connected with said tool holder in a plurality of positions at different distances from said outlining tool.

18. A pattern-grading machine comprising a holder having means for gripping a primary pattern and a sheet of stock from which a secondary pattern is to be formed, a gage adapted to co-act with the edges of the primary pattern, a tool holder, an outlining tool carried by said holder for forming the outlines of a secondary pattern on the stock, and proportional-motion mechanism connected with said pattern holder, gage and tool holder, said gage having means for guiding the pattern edge in a plurality of locations with respect to the point of engagement between the proportional-motion mechanism and gage, and provisions for shifting the point of attachment of said mechanism to the tool holder equally and oppositely to the variations in the position of the pattern.

19. A pattern-grading machine comprising a stationary tool holder, a pattern and stock holder movable with relation to said tool holder, a gage adapted to coöperate with a pattern carried by said pattern holder, an outlining tool mounted in said tool holder and adapted to form the outlines of a secondary pattern in a sheet of stock carried by said pattern and stock holder, and pantographic mechanism pivotally connected to said tool holder and having connections with said gage and pattern holder, whereby movements of the pattern holder toward and from said tool will produce corresponding proportional movements of said gage and cause the stock to be proportionately advanced and withdrawn relatively to the outlining tool.

20. A pattern-grading machine comprising a stationary outlining tool, a movable pattern and stock holder adapted to hold a pattern and sheet of stock movable to carry the latter past said outlining tool, a guide coöperating with said pattern, and pantographic mechanism having a stationary pivotal connection with said tool and a movable connection with said work and pattern holder and said guide.

21. A pattern-grading and cutting machine comprising coöperating cutters held in unvarying location, means for actuating one of said cutters, a pattern and stock holder with means for gripping a standard pattern and sheet of stock and movable so as to insert such stock between said cutters, a gage, and pantographic mechanism connected with said holder and gage and pivotally mounted to turn about an axis passing through the cutting point of said cutters.

22. A pattern-grading and cutting machine comprising a cutter adapted to divide a sheet of stock, a holder having means for gripping both a standard pattern and a sheet of stock in position to permit the latter to be acted upon by said cutter, a guide coöperating with the edges of said pattern, and a pantograph having connection with said pattern and stock holder, said guide and said cutter, whereby relative movements between the several elements are permitted to cause the cutter to sever from the stock a piece similar in form to the pattern, and having the same relative proportions as the latter.

23. A pattern-grading machine comprising a pattern holder, a stock clamp, a tool for outlining on the stock a form similar to that of the pattern, a guide to coöperate with the edges of the pattern, pantographic mechanism, two blocks independently connected with said pantographic mechanism, a member by which said guide is carried, a second member having a pivotal connection with said tool, and means for securing either of said members detachably to either of said blocks.

24. A pattern-grading machine comprising a pattern holder, a stock clamp, a tool for outlining on the stock a form similar to that of the pattern, a guide to coöperate with the edges of the pattern, pantographic mechanism, two blocks independently connected with said pantographic mechanism, two bars placed side by side and slidingly contained in said blocks, one of said bars being connected to said guide and the other being connected to said outlining tool, and means for detachably securing either of said bars to either of said blocks.

25. The combination of an outlining tool remaining continuously in one location, and proportional-motion mechanism for enlarging or reducing a given object having connection with said tool at a fixed point and being movable, with the object to be enlarged or reduced, about such point of attachment.

26. The combination of an outlining tool remaining continuously in one location, and proportional-motion mechanism for enlarging or reducing a given object, to which such object is attached, and having connection with said tool at a fixed point, said mechanism and object being movable about such point of attachment.

27. The combination of an outlining tool remaining continuously in one location, and proportional-motion mechanism for enlarging or reducing a given object, to which such object is attached, and having connection with said tool at a fixed point, and a gage or tracer with which said object is adapted to make contact and to which said mechanism is also connected, the object and gage being movable relatively to each other and both being movable with the proportional-motion mechanism angularly about the connection of the latter with said tool.

In testimony whereof I have affixed my signature, in presence of two witnesses.

ALBERT F. PRESTON.

Witnesses:
   A. C. RATIGAN,
   P. W. PEZZETTI.